United States Patent [19]

Krumm

[11] 4,422,538

[45] Dec. 27, 1983

[54] FRICTION CLUTCH, ESPECIALLY FOR MOTOR VEHICLES

[75] Inventor: Klaus-Dieter Krumm, Bühl, Fed. Rep. of Germany

[73] Assignee: Luk Lamellen und Kupplungsbau GmbH, Bühl, Fed. Rep. of Germany

[21] Appl. No.: 86,138

[22] Filed: Oct. 18, 1979

[30] Foreign Application Priority Data

Oct. 20, 1978 [DE] Fed. Rep. of Germany ....... 2845855

[51] Int. Cl.³ .............................................. F16D 13/70
[52] U.S. Cl. ............................. 192/70.14; 192/107 M
[58] Field of Search ................... 192/107 M, 70.14; 74/572; 75/123 CB, 123 J, 123 M; 188/251 M

[56] References Cited

U.S. PATENT DOCUMENTS

| 2,485,761 | 10/1949 | Millis et al. | 75/123 CB |
| 2,734,822 | 2/1956 | Lamb | 75/123 CB |
| 2,995,441 | 8/1961 | Rubel | 75/123 CB X |
| 3,021,592 | 2/1962 | Herron et al. | 192/107 M X |
| 3,299,482 | 1/1967 | Tache et al. | 75/123 CB X |
| 3,559,775 | 2/1971 | Miller | 75/123 CB X |
| 3,584,718 | 6/1971 | Schiefer et al. | 192/107 M X |
| 3,744,604 | 7/1973 | Austen | 192/107 M X |
| 3,767,386 | 10/1973 | Ueda et al. | 75/123 J X |

Primary Examiner—Rodney H. Bonck
Attorney, Agent, or Firm—Kontler, Grimes & Battersby

[57] ABSTRACT

A friction clutch wherein the pressure plate and/or the flywheel consists of finely striped pearlitic cast iron with a free ferrite content of less than 5%, with a graphite distribution finer than 3 according to VDG specification P 441, and with a titanium content of between 0.16% and 0.3% by weight. The friction disc between the pressure plate and the flywheel has two friction linings at least one of which, namely, the lining facing the part with a higher titanium content, consists of a sintered metallic or ceramic material or contains organic components. The pressure plate and/or the flywheel further contains up to 0.25% by weight of tin and up to 1% by weight of copper. The ratio of copper to tin is approximately four-to-one.

12 Claims, 1 Drawing Figure

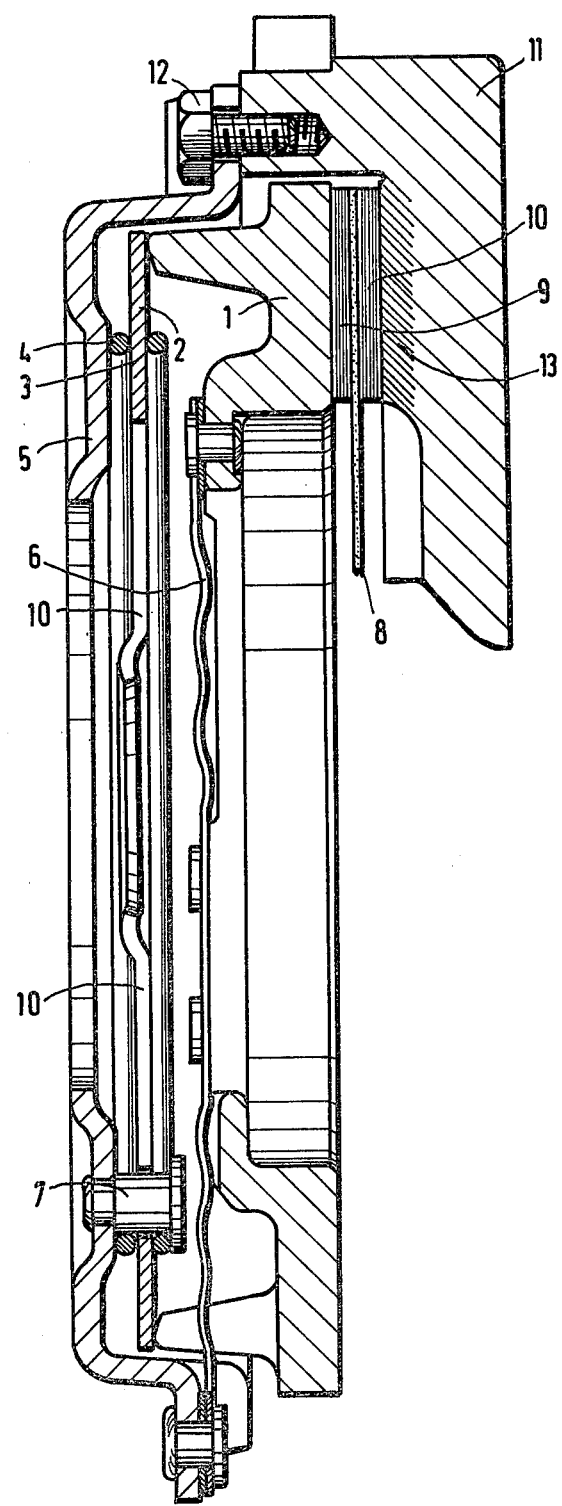

FRICTION CLUTCH, ESPECIALLY FOR MOTOR VEHICLES

BACKGROUND OF THE INVENTION

The invention relates to a friction clutch, especially for motor vehicles, having at least one pressure plate which is acted upon by at least one spring braced against a further part, in the direction of a part such as a flywheel having a counter friction surface.

The pressure plates of such clutches are customarily made of cast iron with laminar graphite, i.e., so-called gray iron. With the gray iron qualities used heretofore, undesirable wear which impairs the service life and the operation of the clutch in the form of abrasion and scoring at the counter friction surfaces of the clutch disc, especially at the pressure plate friction surface but also at the flywheel friction surface, occurs if different friction pairings are used, especially at higher stresses such as are common nowadays in light-weight construction for high-speed drive units.

OBJECTS AND SUMMARY OF THE INVENTION

It is an object of the present invention to eliminate these drawbacks and to obtain a longer service life by increasing the hot and wear strength and to furthermore ensure proper operation of the friction clutch assembly over the service life.

According to the invention, this is achieved by the provision that the pressure plate consists of finely striped pearlitic cast iron with a free ferrite content of less than 5% and a graphite arrangement size corresponding to the guideline as per VDG Specification P441 finer than 3 and contains approximately 0.18 and preferably, between 0.16 and 0.3 weight percent titanium.

It has been found that in friction clutches with pressure plates titanium-alloyed in this manner, no major working-in or scoring occurs on the running surface of the pressure plate and only very slight and uniform wear takes place. This can probably be explained by the particularly favorable influences of the alloying with the titanium, which causes a change in the arrangement and a decrease of the graphite laminations contained in the pearlitic structure and further makes possible the formation of free special titanium carbides and titanium nitrides, and the share of D-graphite thereby increases. The graphite-stabilising effect of titanium is also accompanied by a deoxidizing and denitrating action. To counteract, with the desired finer structure of the graphite and the improved wear properties connected therewith, the secondary phenomenon, often accompanying titanium, of an increase of the ferrite content in the metallic matrix, and to counteract at the same time the occurrence of a partly ledeburitic structure in the case of rapid cooling, an alloy with tin and/or copper is additionally made, according to an additional feature of the invention. The content of copper should be maximally about 1% and of tin, maximally about 0.25%. If the elements are combined, the percentage of alloying copper to tin should be in a ratio of about 4:1. The graphite laminations which are predominantly present in pearlitic form, form with the matrix a hard, heat- and wear-resistant structure. It has further been found that in such pressure plates a smoothing of the roughness peaks caused by the machining of the running surface occurs, which has a particularly favorable effect on the service life of the clutch, since no material projections are formed at the pressure plate due to uneven wear, at which otherwise temperature peaks would appear when the clutch is operated, which causes the already mentioned disadvantages in the hitherto used pressure plates.

To further improve the friction clutch unit, it may be of advantage if the flywheel cooperating with the friction clutch also consists of cast iron and has, at least in its areas facing the friction disc, a titanium content in the amount of at least approximately 0.18 and preferably, 0.16 to 0.3 weight percent.

It may be especially advantageous if at least one of the parts, the pressure plate and/or the flywheel, has a titanium content in the amount of at least approximately 0.18 and preferably, 0.16 to 0.3 weight percent, while the friction disc, at least on the friction side facing the part with the relatively large titanium content, has friction linings of sintered material such as friction material of ceramic material, sintered bronze or the like. However, it may also be advantageous if the friction disc has, at least on one of its sides, a friction material with organic components.

BRIEF DESCRIPTION OF THE DRAWING

The invention will now be explained in greater detail with the aid of the embodiment example shown in the single FIGURE.

DESCRIPTION OF THE PREFERRED EMBODIMENTS

In the friction clutch shown in part in the FIGURE as a cross section, the pressure plate 1, the cup spring 2, its pivot bearings 3 and 4 and the cover 5 are combined in an assembly. The pressure plate and the cover are connected to each other via leaf springs 6 and the cup spring 2 is connected to the cover via the support elements 7 engaging at the pivot bearing 3. This assembly is fastened with the interposition of a friction disc 8 which carries friction linings 9 and 10 on both sides, to a flywheel 11 via connecting screws 12. The pressure plate 1 consists of finely striped pearlitic cast iron with a ferrite content less than 5 percent and a graphite arrangement corresponding to the guideline as per VDG Specification P 441 finer than 3, and contains preferably between 0.16 and 0.3 weight percent titanium. The flywheel 11, which may also be made of cast iron with laminar graphite, has, at least in the areas 13 facing the friction lining 10, a titanium content in the amount of at least approximately 0.18 and preferably, 0.16 to 0.3 weight percent.

The pressure plate 1 and the flywheel 11 can have a different titanium content. The friction disc 8 can have on the friction side facing the part with a relatively high titanium content, friction linings of sintered material, such as friction material of ceramic material, sintered bronze or the like.

The friction disc 8 may furthermore have, at least on one of its sides 9, 10, a friction material with organic components.

The invention is not limited to the embodiment described but relates also to friction clutch units, in which the pressure plate and/or the flywheel have alloying elements other than titanium which have a similar effect on the structure of the cast iron with laminar graphite, such as molybdenum, vanadium, tantalum and niobium.

I claim:

1. In a friction clutch, the combination of a first component including a pressure plate; a second component at one side of said first component; a friction disc between said components; and means for biasing said first component toward said friction disc, said first component consisting of finely striped pearlitic cast iron containing less than 5 percent free ferrite and laminar graphite finer than 3 in size according to VDG specification P441, at least one of said components containing between 0.16 and 0.3 percent by weight of titanium.

2. The combination of claim 1, wherein said one component contains approximately 0.18 percent by weight of titanium.

3. The combination of claim 1, wherein said one component is said first component and said second component includes a portion adjacent to said friction disc and having a titanium content in the range between 0.16 and 0.3 percent by weight.

4. The combination of claim 3, wherein the titanium content of said portion of said second component is approximately 0.18 percent by weight.

5. The combination of claim 3, wherein said second component comprises a flywheel.

6. The combination of claim 1, wherein one of said components contains a higher percentage of titanium than the other of said components and said friction disc includes a lining adjacent to the component with a higher titanium content and consisting of a sintered material.

7. The combination of claim 6, wherein said sintered material is bronze.

8. The combination of claim 6, wherein said sintered material is a ceramic substance.

9. The combination of claim 1, wherein said friction disc has first and second portions adjacent to the respective components and at least one of such portions constitutes a friction material with organic components.

10. The combination of claim 1, wherein at least one of said components has a copper content of maximally 1% per weight.

11. The combination of claim 1, wherein at least one of said components has a tin content of maximally 0.25 % per weight.

12. The combination of claim 1, wherein at least one of said components contains at most 0.25% by weight of tin and at most 1% by weight of copper which is alloyed with tin, the ratio of copper to tin being approximately four-to-one.

* * * * *